US011768490B2

(12) United States Patent
Tschanz et al.

(10) Patent No.: US 11,768,490 B2
(45) Date of Patent: Sep. 26, 2023

(54) SYSTEM AND METHODS FOR CONTROLLING STATE TRANSITIONS USING A VEHICLE CONTROLLER

(71) Applicant: UATC, LLC, Mountain View, CA (US)

(72) Inventors: Frederic Tschanz, Pittsburgh, PA (US); Maitreya Jayesh Naik, Pittsburgh, PA (US); Diana Yanakiev, Birmingham, MI (US); Aaron L. Greenfield, Pittsburgh, PA (US); Scott C. Poeppel, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

(21) Appl. No.: 17/994,764

(22) Filed: Nov. 28, 2022

(65) Prior Publication Data
US 2023/0085877 A1 Mar. 23, 2023

Related U.S. Application Data

(63) Continuation of application No. 16/910,554, filed on Jun. 24, 2020, now Pat. No. 11,513,517.
(Continued)

(51) Int. Cl.
*G05D 1/00* (2006.01)
*G05D 1/02* (2020.01)

(52) U.S. Cl.
CPC ......... *G05D 1/0061* (2013.01); *G05D 1/0088* (2013.01); *G05D 1/0276* (2013.01); *G05D 2201/0213* (2013.01)

(58) Field of Classification Search
CPC .. G05D 1/0061; G05D 1/0088; G05D 1/0276; G05D 2201/0213
See application file for complete search history.

(56) References Cited

U.S. PATENT DOCUMENTS 9,690,292 B1 * 6/2017 Chan ................. B60R 21/01552
9,904,286 B2 2/2018 Kozak
(Continued)

FOREIGN PATENT DOCUMENTS

EP 3421316 1/2019
WO WO 2019/058460 3/2019

OTHER PUBLICATIONS

International Search Report and Written Opinion for Application No. PCT/US2021/024891, dated Jul. 8, 2021, 13 pages.

*Primary Examiner* — Ramsey Refai
(74) *Attorney, Agent, or Firm* — Dority & Manning, P.A.

(57) ABSTRACT

The present disclosure is directed to controlling state transitions in an autonomous vehicle. In particular, a computing system can initiate the autonomous vehicle into a no-authorization state upon startup. The computing system can receive an authorization request. The computing system determines whether the authorization request includes a request to enter the first or second mode of operations, wherein the first mode of operations is associated with the autonomous vehicle being operated without a human operator and the second mode of operations is associated with the autonomous vehicle being operable by a human operator. The computing system can transition the autonomous vehicle from the no-authorization state into a standby state in response to determining the authorization request includes a request to enter the first mode of operations or into a manual-controlled state in response to determining the authorization request is a request to enter the second mode of operations.

20 Claims, 8 Drawing Sheets

Related U.S. Application Data

(60) Provisional application No. 63/001,838, filed on Mar. 30, 2020.

(56) References Cited

U.S. PATENT DOCUMENTS

| | | | |
|---|---|---|---|
| 10,095,228 B1 * | 10/2018 | Kuffner, Jr. | G05D 1/0061 |
| 2015/0134178 A1 | 5/2015 | Minoiu-Enache | |
| 2016/0362116 A1 * | 12/2016 | Otsuka | B60W 50/0098 |
| 2017/0102700 A1 | 4/2017 | Kozak | |
| 2018/0107214 A1 | 4/2018 | Chandy | |
| 2018/0196427 A1 | 7/2018 | Majumdar et al. | |
| 2018/0299898 A1 | 10/2018 | Luo et al. | |
| 2019/0079513 A1 | 3/2019 | Greenfield et al. | |
| 2020/0278685 A1 | 9/2020 | Jang et al. | |

* cited by examiner

SYSTEM AND METHODS FOR CONTROLLING STATE TRANSITIONS USING A VEHICLE CONTROLLER

PRIORITY CLAIM

The present application is a continuation of U.S. Non-Provisional patent application Ser. No. 16/910,554 having a filing date of Jun. 24, 2020, which claims priority to and the benefit of U.S. Provisional Patent Application No. 63/001,838, filed Mar. 30, 2020. Applicant claims priority to and the benefit of each of such applications and incorporates all such applications herein by reference in its entirety.

FIELD

The present disclosure relates generally to autonomous vehicles. More particularly, the present disclosure relates to managing the state transitions for the autonomous vehicle using a vehicle controller.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such a surrounding environment. Some autonomous vehicles can switch between an operator-controlled mode and a computer-controlled mode. Managing the transitions through various states is important to safe operation of the autonomous vehicles.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include initiating the autonomous vehicle into a no-authorization state upon startup. The method can include receiving an authorization request. The method can include determining whether the authorization request includes a request to enter into a first mode of operations or a second mode of operations, wherein the first mode of operations is associated with the autonomous vehicle being operated without a human operator and the second mode of operations is associated with the autonomous vehicle being operable by a human operator. The method can include transitioning the autonomous vehicle from the no-authorization state into a standby state in response to determining the authorization request includes a request to enter the first mode of operations or into a manual-controlled state in response to determining the authorization request is a request to enter the second mode of operations.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
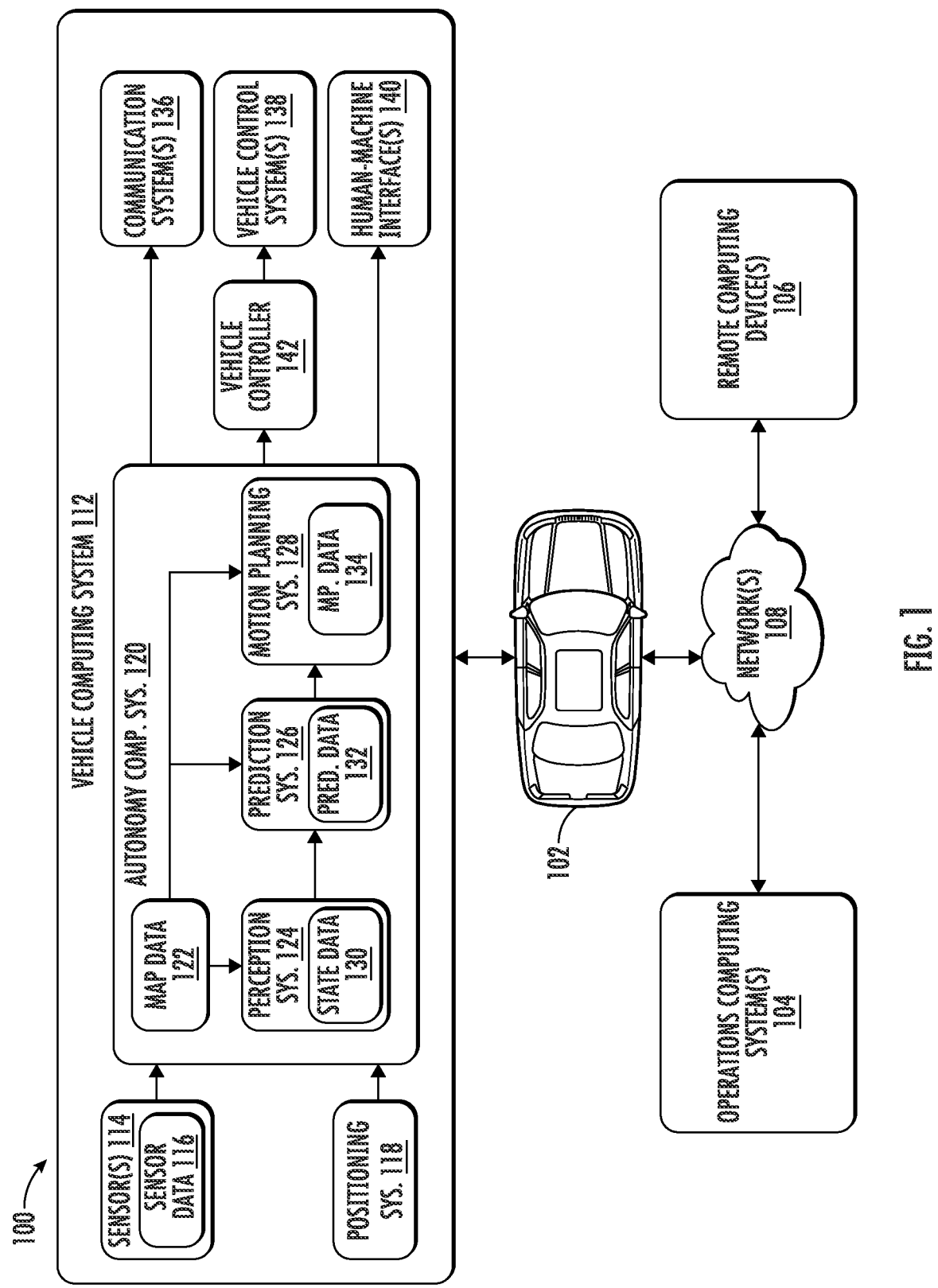
FIG. 1 depicts a block diagram of an example autonomous vehicle according to example embodiments of the present disclosure.

Generally, the present disclosure is directed to a system for allowing a vehicle controller (e.g., a vehicle interface module "VIM") to control mode transitions for an autonomous vehicle to ensure that the transitions between different modes are safe. An autonomous vehicle can have two modes of operations. The first mode of operations associated with a series of states for an autonomous vehicle that does not involve a human control of the vehicle (e.g., by a human operator) at any point during the mode of operations (e.g., a "no-vehicle operator" (NVO) mode). The second mode of operations can be associated with a series of states that can include a human operator (e.g., a "vehicle operator" (VO) mode). Thus, the second mode of operations includes both a human-controlled state and/or a computer control state that allows for human intervention.

To ensure that the vehicle does not transition directly between the first mode of operations and the second mode of operations, the vehicle controller (VIM) initializes into a no authorization mode when the vehicle comes online. While in the no authorization mode, the vehicle controller can restrict the autonomous vehicle from performing any tasks. The vehicle controller can receive an authorization request (e.g., from the vehicle's onboard autonomy system, a physical key interface, a remote computing system, etc.). The vehicle controller determines, based on the received authorization request, whether the authorization request is a request to enter the first mode of operations (NVO mode) or the second mode of operations (VO mode). If the vehicle controller determines that the authorization request is a request to enter the first mode of operations, the vehicle controller transitions into a standby state, from which it can later transition into a fully autonomous state. If the vehicle controller determines that the authorization request is a request to enter the second mode of operations, the vehicle controller transitions into a human-operator control state. From the human operator control state, the vehicle controller can transition into a computer-driven state. Once either the first mode of operations or the second mode of operations has been entered, the vehicle controller cannot transition to the other mode of operations without first transitioning into the no-authorization state.

For example, an autonomous vehicle can turn on and boot up its system into an initial no-authorization state. Once in the no-authorization state, the vehicle controller, the associated autonomy system, and the vehicle itself can wait until an authorization request is issued. An authorization request can be received by the vehicle controller from another computing system such as, for example, the autonomy system or a remote services system associated with the autonomous vehicle. The vehicle controller can determine whether the authorization request includes a request to enter the first mode of operations or the second mode of operations. In this example, the request from the remote computing system includes an authorization request to enter the first mode of operations. The vehicle controller can, after verifying that the vehicle is prepared to enter into the first mode of operations, transition the autonomous vehicle into a standby state associated with the first mode of operations. While in the first mode of operations, any user input (e.g., from a passenger in the vehicle) can be ignored. Thus, once in the first mode of operations, the autonomous vehicle or the vehicle controller cannot transition to a human-driven mode and, instead, reverts to the no authorization state to enter the second mode of operations. In this way, the vehicle controller can safely and efficiently assist the autonomous vehicle to smoothly transition between modes and states.

An autonomous vehicle can include a vehicle computing system. The vehicle computing system can be responsible for, among other functions, creating the control signals needed to effectively control an autonomous vehicle. The vehicle computing system can include an autonomy computing system. The autonomy computing system can include one or more systems that enable the autonomous vehicle to plan a route, receive sensor data about the environment, perceive objects within the vehicle's surrounding environment (e.g., other vehicles), predict the motion of the objects within the surrounding environment, generate trajectories based on the sensor data, and perception/predicted motion of the objects, and, based on the trajectory, transmit control signals to a vehicle control system and thereby enable the autonomous vehicle to move to its target destination. To accomplish these operations, the autonomy computing system can include, for example, a perception system, a prediction system, and a motion planning system.

To help maintain awareness of the vehicle's surrounding environment, the vehicle computing system (e.g., the perception system) can access sensor data from one or more sensors to identify static objects and/or dynamic objects (actors) in the autonomous vehicle's environment. To help determine its position within the environment (and relative to these objects), the vehicle computing system can use a positioning system and/or a communication system to determine its current location. Based on this location information, the vehicle computing system can access map data (e.g., HD map data, etc.) to determine the autonomous vehicle's current position relative to other objects in the world (e.g., bicycles, pedestrians, other vehicles, buildings, etc.), as well as map features such as, for example, lane boundaries, curbs, and so on.

The vehicle computing system (e.g., the perception system) can utilize the sensor data to identify one or more objects in the local environment of the autonomous vehicle. The sensor data can include, but is not limited to, data acquired via camera sensors, LIDAR sensors, and RADAR sensors. Using this sensor data, the vehicle computing system can generate perception data that describes one or more object(s) in the vicinity of the autonomous vehicle (e.g., current location, speed, heading, shape/size, etc.).

The generated perception data can be utilized to predict the future motion of the object(s). For example, the vehicle computing system (e.g., the prediction system) can use the perception data to generate predictions for the movement of one or more objects as an object trajectory including one or more future coordinates/points. In some implementations, the perception and prediction functions of the vehicle computing system can be included within the same system.

The vehicle computing system (e.g., motion planning system) can use the perception data, prediction data, map data, and/or other data to generate a motion plan for the vehicle. For example, a route can describe a specific path for the autonomous vehicle to travel from a current location to a destination location. The vehicle computing system can generate potential trajectories for the autonomous vehicle to follow as it traverses the route. Each potential trajectory can be executable by the autonomous vehicle (e.g., feasible for the vehicle control systems to implement). Each trajectory can be generated to comprise a specific amount of travel time (e.g., eight seconds, etc.)

The autonomous vehicle can select and implement a trajectory for the autonomous vehicle to navigate a specific segment of the route. For instance, the trajectory (or a representation thereof) can be provided to a vehicle controller. The vehicle controller can include a vehicle interface module (VIM) that can obtain data from one or more vehicle systems such as the autonomy system, a collision mitigation system, and/or other systems. The vehicle controller can also communicate with an autonomy computing system associated with the autonomous vehicle. The autonomy computing system can serve as a communication interface to help confirm the state/status/conditions/ability of the vehicle. The vehicle controller can utilize the data it obtains and interface with the vehicle control system(s) to help implement trajectories for the vehicle to follow. For example, the vehicle controller can translate motioning plan/trajectory data into instructions for controlling the autonomous vehicle including adjusting the steering of vehicle "X" degrees, applying a certain magnitude of braking force, etc. The vehicle control system(s) can generate specific control signals for the autonomous vehicle (e.g., adjust steering, braking, velocity, and so on). The specific control signals can cause the autonomous vehicle to move in accordance with the selected trajectory. The vehicle controller can have other functions such as, for example, safely transitioning the mode and/or state of the vehicle, as described herein.

The vehicle controller can serve as an interface between the autonomy system and the autonomous vehicle itself. In some examples, the vehicle controller can include multiple control lanes. In some examples, the vehicle controller can have a dual-lane control architecture. The vehicle controller can include a first control lane and a second control lane. Each lane control can constitute a full system that can be used to receive signals from the autonomy system, track the current state of the autonomous vehicle, and transmit control signals from the autonomy system to the vehicle itself.

In some examples, the vehicle controller can designate one of either the first control lane or the second control lane as a primary lane, and the other as a secondary lane (e.g., based on a capability of the first control lane and a capability of the second control lane). The vehicle controller can use the primary lane to control the autonomous vehicle so that both the first control lane and the second control lane are not simultaneously attempting to control the operation of the autonomous vehicle.

In some examples, the vehicle controller can enable the first control lane to implement a motion plan from the autonomy system and silence the second control lane. By designating the first control lane as the primary lane, the autonomous vehicle can be controlled when the motion plan is implemented by the first control lane, but not when the motion plan is implemented by the second control lane.

In some examples, the primary lane can synchronize with the secondary lane to ensure that both have kept an accurate track of the vehicle's current state including but not limited to the current mode of operation of the vehicle and the current state within that mode of operation. Thus, any request to change the mode of operation or change the state of the mode of operation needs to be implemented in both lanes simultaneously or near-simultaneously. Thus, if one control lane fails for any reason, the secondary control lane is ready to continue immediately.

The vehicle controller can include a variety of subsystems to effectively provide a variety of services within the autonomous vehicle. The vehicle controller can obtain input from a variety of sources including, but not limited to, the autonomy system, the vehicle platform interface, the collision mitigation interface, a network communication interface (e.g., for communicating with remote computing systems), The following is a description of the state machine associated with mode switching through the vehicle controller. The state machine can be implemented by the vehicle mode management system. The vehicle controller can also ensure that the primary lane control and the secondary lane control synchronize (e.g. have the same state) and both synchronize with the state of the autonomous vehicle itself. Thus, each time the vehicle controller changes from one mode to another or from one state to another, it can confirm the switch with the autonomous vehicle. If the autonomous vehicle does not confirm or authorize the change in mode or state, the vehicle controller can remain in the previous state or node.

When the vehicle controller (along with the rest of the autonomous vehicle) boots up (or powers on), the vehicle controller can initialize the vehicle into a no authorization state. The no authorization state is not part of either the first mode of operations or the second mode of operations. Instead, the no authorization state can operate as a neutral state in which the autonomous vehicle does not take any actions and waits for an authorization request.

The vehicle controller can receive an authorization request. The authorization request can be generated by one or more different sources including, but not limited to, a system within the autonomous vehicle itself (e.g., the autonomy system), a remote computing system associated with the autonomous vehicle (e.g., a services system that manages a ridesharing service), or a physical key interface (e.g., via a user physically inserting a key or key-like device into the autonomous vehicle to initiate the autonomous vehicle into a drivable mode).

In response to receiving an authorization request, the vehicle controller can determine whether the request includes a request to enter a first mode of operations or a request to enter a second mode of operations. The first mode of operations and the second mode of operations are distinct modes such that when the vehicle is in either of the modes, the vehicle controller cannot change to a state associated with the other mode without first returning to the no authorization state.

The first mode of operations can be a mode in which no operator is present in the vehicle. While in this first mode of operations, any user interaction with the vehicle can be ignored. When the vehicle controller determines that an authorization request includes a request to enter the first mode of operations, the vehicle controller can cause the mode of the autonomous vehicle to change to the first mode of operations and enter a standby state. As noted above, prior to entering the first mode of operations, the vehicle controller can transmit a request to the autonomous vehicle to determine whether the autonomous vehicle is prepared to enter the first mode of operations. Only when receiving a confirmation that the autonomous vehicle is prepared to enter the first mode of operations does the vehicle controller change the mode of the vehicle and enter the standby state.

The standby state can be a state in which the autonomous vehicle can prepare to enter a full computer control state. While in a standby state, the autonomous vehicle is immobile and cannot react to user input. Once the autonomous vehicle has signaled its readiness to transition into the full computer control state, the vehicle controller can wait for a state transition request from the autonomy system (or from a remote computing system). In some examples, the state transition request can be received from the autonomy system associated with the autonomous vehicle. In some examples, the state transition request can be received from a remote server system that controls or is associated with the autonomous vehicle.

Alternatively, the vehicle controller can automatically transition from the standby state into the full computer control state once the autonomous vehicle has signaled its readiness to transition to computer control without the need for an additional state transition request.

Once the vehicle controller has transitioned to the computer-controlled state, the autonomous vehicle can then be completely controlled by the autonomy system associated with the autonomous vehicle. Actions taken by the autonomous vehicle can be in response to commands generated by the autonomy system. In some implementations, a remote system (e.g., a remote assistance system) can override the autonomy system to remotely assist the autonomous vehicle. While in the computer-controlled state, the vehicle controller can receive a state transition request. The state transition request can request that the vehicle leave the computer-controlled state and enter the standby state. Note that the state machine is configured such that the only state that can be reached from the computer-controlled state is the standby state.

In some examples, the autonomous vehicle can ensure that movement has ceased prior to entering the standby state. Thus, when a state transition request is received by the vehicle controller, the autonomous vehicle can be instructed by the autonomy system or by the vehicle controller itself to take actions that will bring the autonomous vehicle to a stop. As with all other state transitions, the vehicle controller can synchronize that intent to change state with the service provider and with any other control lanes. Once the intended transition is synchronized between all relevant components, the vehicle controller can transition the autonomous vehicle from the computer control state to the standby state.

Once in the standby state, the vehicle controller can receive a transition request to transition into the no authorization state. If a request to transition into the second mode of operations is received while in the standby state, the vehicle controller first transitions to the no authorization state before transitioning into the second mode of operations. In this way, the vehicle controller ensures that the autonomous vehicle does not transition directly between the first and second modes of operation.

In some examples, the autonomous vehicle can power down and restart so that it reinitializes into the no authorization state before transitioning into the second mode of operations. Alternatively, once in the standby state, the vehicle controller can transition to the no authorization state without powering down and, while in the no authorization state, receive authorization to transition into the second mode of operations.

When the vehicle controller receives an authorization request to enter a mode of operations and determines that the request is to enter the second mode of operations, the vehicle controller can transition into a user control state. This transition can be conditioned on the vehicle controller synchronizing with the autonomous vehicle itself (e.g., via the autonomy computing system) and any other control lanes. While in the manual-controlled state, an operator can operate the in-vehicle controls to drive the autonomous vehicle.

In some examples, while in the manual-controlled state, the vehicle controller can receive a request to enter full computer control of the autonomous vehicle. The computer-controlled state associated with the second mode of operations is distinct from the full computer control state associated with the first mode of operations. For example, in the first mode of operations, the computer control state can ignore any human intervention and cannot transition into an operator-controlled state. In contrast, the computer-controlled state associated with the second mode of operations can transition into an operator-controlled state upon request and can be responsive to user input. For example, if a user presses the brake pedal, the vehicle controller can respond by transitioning out of the computer-controlled state and re-engaging the operator control state.

While in the computer-controlled state associated with the second mode of operations, the vehicle controller can receive a request to transition out of the computer-controlled state into a manual-controlled state. As noted above, this request can be generated by user interaction with the autonomous vehicle, by the autonomy system, or by a remote computing system directing the autonomous vehicle to return to operator control.

While in the manual-controlled state, the vehicle controller can receive a request to transition into the no authorization state. This request can be part of a request to transition to the first mode of operations or can be included in a request to stop operations and power down. The vehicle controller can establish that both the service provider and the control lanes are aware of the transition request and confirm that the transition is authorized. The vehicle controller can transition to the no authorization state.

Each state described above can have one or more sub-states that facilitate a smooth transition between the states. The following provides a description of the possible example sub-states and how they interact with each other. By way of example, the no authorization state can include a plurality of possible sub-states. A first sub-state can be a sub-state in which the vehicle controller has not yet received an authorization request. The vehicle controller can transition into a subsequent sub-state in response to receiving an authorization request. For example, the vehicle controller can enter a second sub-state if the request is to enter the first mode of operations or a third sub-state if the request is to enter the second mode of operations.

In both the second and third sub-state, the vehicle controller can request authorization from a third party (e.g., the vehicle itself) to ensure that the autonomous vehicle is prepared to transition into another state. If the autonomous controller receives an acknowledgment or authorization to transition into the requested mode, the vehicle controller can transition from the second sub-state to the standby state if entry into the first mode of operations was requested or from the third sub-state into the manual-controlled state if entry into the second mode of operations was requested.

However, if no acknowledgment or response is received within a predetermined time frame, the vehicle controller may not transition into the desired mode of control and instead can transition into a state representing a potential failure. For example, if while in the second sub-state and awaiting transition into the first mode of operations, the vehicle controller exceeds the allotted time for receiving acknowledgment, the vehicle controller can transition into a fourth sub-state, the fourth sub-state representing a potential failure to transition. The fifth sub-state can perform the same or similar role for the second mode of operations. While in the fourth or fifth sub-state respectively, the vehicle controller can still transition into the first mode of operations or the second mode of operations if the authorization request is successful (e.g., the vehicle controller receives an acknowledgment of the intent of the autonomous vehicle to transition states). However, if no acknowledgment is received within the predetermined time frame, the vehicle controller can transition back to the first sub-state and await a new authorization request.

Similarly when first entering the standby state, the initial sub-state can be a first nominal sub-state in which the vehicle controller waits to receive a state transition request to enter the computer control state. When the vehicle controller receives a request to transition into the computer control state, the vehicle controller can ensure that the vehicle controller's intent to state switch matches the intent of one or more other control lanes, either locally or remotely. For example, before transitioning to another sub-state within the standby state, the vehicle controller can request information from one or more other systems to ensure that all the mode controllers (e.g., mode managers of control lanes) have a matching intent to transition to the computer-controlled state.

The vehicle controller can transition to a sub-state in which the vehicle controller requests entry into the computer-controlled state from the autonomous vehicle itself. This can occur, for example, once the vehicle controller has confirmed matching intent among control lanes. As above, the vehicle controller can wait for confirmation from the vehicle itself before transitioning into the computer control state. If the confirmation is not received within a predetermined time, the vehicle controller can enter a failure state. If, while in this failure state, a delayed confirmation arrives within a predetermined period of time, the vehicle controller can transition to the computer-controlled state. However, if no confirmation arrives, the vehicle controller can transition back to the first nominal sub-state to await further state transition requests.

While in the computer-controlled state, the vehicle controller can initially transition into a first nominal sub-state associated with the computer-controlled state. The vehicle controller can remain in this state until a transition request is received to transition back to the standby state. As above, the vehicle controller can request authorization from the vehicle to transition to the standby state once it has received the state transition request. If confirmation is received within a predetermined time, the vehicle controller can transition to the standby state. However, if no confirmation is received within a predetermined time, the vehicle controller can enter a request fail sub-state waiting for a delayed confirmation. If no delayed confirmation is forthcoming, the vehicle controller will transition back into the first nominal sub-state associated with the computer-controlled state and await further requests.

While in the manual-controlled state, the vehicle controller can first enter into a nominal sub-state wherein the vehicle controller waits to receive a request to transition into the computer-controlled state associated with the second mode of operations. The vehicle controller can remain in this state until a transition request is received to transition to the computer-controlled state. As above, the vehicle controller can request authorization from the vehicle to transition to the computer-controlled state, for example, once it has received the state transition request. If confirmation is received within a predetermined time, the vehicle controller can transition to the computer-controlled state. However, if no confirmation is received within a predetermined period of time, the vehicle controller can enter a request fail sub-state and wait for a delayed confirmation. If no delayed confirmation is forthcoming, the vehicle controller can transition back into the first nominal sub-state associated with the manual-controlled state and await further requests.

In the computer-control state, the vehicle controller can wait to receive a state transition request. When receiving a state transition request while in the computer-controlled state associated with the second mode of operation, the vehicle controller can immediately transition to the manual-controlled state. Once in that manual-controlled state, the vehicle controller can request authorization for the state transition and confirm that state synchronization was preserved.

The following provides an end-to-end example of the technology described herein. A vehicle controller can initiate an autonomous vehicle into a no-authorization state upon startup. The vehicle controller can receive an authorization request. The authorization request can be associated with an autonomy computing system onboard the autonomous vehicle. The authorization request can be communicated from a remote computing system that is remote from the autonomous vehicle. In some implementations, the authorization request can be associated with a physical key interface.

The vehicle controller can determine whether the authorization request includes a request to enter into a first mode of operations or a second mode of operations, wherein the first mode of operations is associated with an autonomous vehicle without a human operator and the second mode of operations is associated with an autonomous vehicle that includes a human operator.

The vehicle controller can transition the autonomous vehicle into a standby state in response to determining the authorization request includes a request to enter the first mode of operations or into a manual-controlled state in response to determining the authorization request is a request to enter the second mode of operations. While in the first mode of operations the autonomous vehicle may not respond to operator input.

While in the standby state, the vehicle controller can receive a request to transition into a first computer-controlled state. In response to receiving the request, the vehicle controller can determine that the autonomous vehicle is prepared to enter the first computer-controlled state. In response to determining that the autonomous vehicle is prepared to enter the first computer-controlled state, the vehicle controller can transition from the standby state to a first computer-controlled state.

While in the first computer-controlled state, the vehicle controller can receive, from the autonomous system, a request to exit the first computer-controlled state. The vehicle controller can transmit controls to the autonomous vehicle that cause the autonomous vehicle to come to a safe stopping point and become immobile. In response to determining that the autonomous vehicle has become immobile, the vehicle controller can transition from the first computer control state to the standby state.

While in the standby state, the vehicle controller can receive a request to transition to the second mode of operations. The vehicle controller can transition from the standby state to the no-authorization state. Alternatively, the vehicle controller can transmit a command to cause the autonomous vehicle to power down and reboot into the no-authorization state.

While in the manual-controlled state, the vehicle controller can receive a request to transition into a second computer-controlled state. The vehicle controller can determine that the autonomous vehicle is prepared to enter the second computer-controlled state. In response to determining that the autonomous vehicle is prepared to enter the second computer-controlled state, the vehicle controller can transition from the manual-controlled state to the second computer-controlled state.

The vehicle controller can transmit a state transition request to the autonomous vehicle, the state transition request including information describing the planned transition to the second computer-controlled state. The vehicle controller can receive a confirmation that the autonomous vehicle has updated an autonomous vehicle state to the second computer-controlled state. In response to receiving a confirmation that the autonomous vehicle has updated the autonomous vehicle state to the second computer-controlled state, the vehicle controller can update a vehicle controller state to the second computer-controlled state.

The vehicle controller can determine whether a confirmation has been received from the autonomous vehicle within a predetermined time limit. In response to determining that a confirmation has not been received from the autonomous vehicle within the predetermined time limit, the vehicle controller can enter an error or failure state and remain in the original state.

While in the second computer-controlled state, the vehicle controller can detect operator input to the autonomous vehicle. In response to detecting operator input, the vehicle controller can transition from the second computer control state to the manual-controlled state.

While in the manual-controlled state, the vehicle controller can receive a request to transition to the first mode of operations. The vehicle controller can transmit a command to cause the autonomous vehicle to power down and then reboot into the no-authorization state.

In some examples, the vehicle controller can include a first control lane and a second control lane. The vehicle controller can facilitate the transition into the standby state by, for example, confirming that the first control lane and the second control lane both indicate a transition to the standby state. In another example, the vehicle controller can facilitate a transition into the manual-controlled state by, for example, confirming that the first control lane and the second control lane both indicate a transition to the manual-controlled state.

The systems and methods described herein provide a number of technical effects and benefits. More particularly, the systems and methods of the present disclosure provide improved techniques for controlling mode switching in an autonomous vehicle. For example, the vehicle controller ensures that there are no circumstances in which an autonomous vehicle without an operator can change modes into a manual-controlled state because the vehicle controller ensures that the states associated with no operator present cannot transition into a state in which an operator is expected to be present. The vehicle controller does this by creating two separate state paths, one for the operator mode of operations and one for the non-operator mode of operations. The vehicle controller then ensures that the vehicle cannot transition between the two state paths without first entering a neutral state associated with neither state. Controlling the state of an autonomous vehicle in this way ensures that state transitions of an autonomous vehicle are controlled in a manner that is both safer and more efficient.

In addition, by controlling the mode transitions to ensure safety at the vehicle controller, the autonomous vehicle can avoid any extra monitoring of states during the transition process. By reducing the amount of data analysis and communication necessary during the state transition process, the vehicle controller can reduce the number of processor cycles used by the autonomous vehicle, reduce the amount of memory needed to store information, and thereby reduce energy consumption by the autonomous vehicle system as a whole. Reducing energy consumption increases the useful battery life of any battery systems included in the autonomous vehicle.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

Various means can be configured to perform the methods and processes described herein. For example, a computing system can include initiation unit(s), reception unit(s), request analysis unit(s), transition unit(s) and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to initiate the autonomous vehicle into a no-authorization state upon startup. For example, the vehicle controller can, upon startup, set the initial state of the autonomous vehicle to the no authorization state that is associated with neither the first mode of operations nor the second mode of operations. An initiation unit is one example of a means for initiating the autonomous vehicle into a no-authorization state upon startup.

The means can be configured to receive an authorization request. For example, the vehicle controller can receive an authorization request from an autonomy system associated with the autonomous vehicle, a remote computing system, or a physical key interface. A reception unit is one example of a means for receiving an authorization request.

The means can be configured to determine whether the authorization request includes a request to enter into a first mode of operations or a second mode of operations, wherein the first mode of operations is associated with the autonomous vehicle being operated without a human operator and the second mode of operations is associated with the autonomous vehicle being operable by a human operator. For example, the vehicle controller can determine, based on data included in the authorization request the particular mode of operation that is requested. In some examples, the requested mode of operation can be determined based on the source of the authorization request. A request analysis unit is one example of a means for determining, whether the authorization request includes a request to enter into a first mode of operations or a second mode of operations, wherein the first mode of operations is associated with the autonomous vehicle being operated without a human operator and the second mode of operations is associated with the autonomous vehicle being operable by a human operator.

The means can be configured to transition, the autonomous vehicle from the no-authorization state into a standby state in response to determining the authorization request includes a request to enter the first mode of operations or into a manual-controlled state in response to determining the authorization request is a request to enter the second mode of operations. For example, the vehicle controller can transition into a request mode of operations (either the first or the second) based on the authorization request. The vehicle controller can also synchronize with the autonomous vehicle or a secondary lane controller to ensure that the entire autonomous vehicle system has the same state at the same. A transition unit is one example of a means for transitioning the autonomous vehicle from the no-authorization state into a standby state in response to determining the authorization request includes a request to enter the first mode of operations or into a manual-controlled state in response to determining the authorization request is a request to enter the second mode of operations.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system(s) 138; a human-machine interface 140, and a vehicle controller 142.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that stores data including vehicle status data associated with the status of vehicles including vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle).

Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include one or more autonomy system sensors 114; the positioning system 118; the autonomy computing system 120; the communication system 136; the vehicle control system(s) 138; and the human-machine interface 140; and/or a vehicle controller 142. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy system sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy system sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy system sensor data 116 can be indicative of locations associated with the one or more objects within the surrounding environment of the vehicle 102 at one or more times. For example, autonomy system sensor data 116 can be indicative of one or more LIDAR point clouds associated with the one or more objects within the surrounding environment. The one or more autonomy system sensors 114 can provide the autonomy system sensor data 116 to the autonomy computing system 120.

In addition to the autonomy system sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy system sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy system sensor data 116 from the one or more autonomy system sensors 114, attempt to determine the state of the surrounding environment by performing various processing techniques on the autonomy system sensor data 116 (and/or other data), and generate an appropriate motion plan through the surrounding environment. The autonomy computing system 120 can control the one or more vehicle control system(s) 138 to operate the vehicle 102 according to the motion plan. One or more of these systems/computing functions can be included within the same system and/or share one or more computing resources.

The perception system 124 can identify one or more objects that are proximate to the vehicle 102 based on autonomy system sensor data 116 received from the autonomy system sensors 114. In particular, in some implementations, the perception system 124 can determine, for each object, state data 130 that describes the current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller 142 that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102.

The autonomous vehicle 102 can implement the planned trajectory for the autonomous vehicle 102 to navigate a specific segment of the route. For instance, the trajectory (or a representation thereof) can be provided to a vehicle controller 142. The vehicle controller 142 can include a vehicle interface module (VIM) that can obtain data from one or more vehicle systems such as the autonomy computing system 128 and/or other systems. The vehicle controller 142 can also communicate with a service provider (e.g., a computing system thereof) associated with the autonomous vehicle. The service provider can serve as a communication interface to help confirm the state/status/conditions/ability of the vehicle. The vehicle controller 142 can utilize the data it obtains and interface with the vehicle control system(s) 138 to help implement trajectories for the vehicle to follow. For example, the vehicle controller 142 can translate motioning plan/trajectory data into instructions for controlling the autonomous vehicle 102 including adjusting the steering of vehicle "X" degrees, applying a certain magnitude of braking force, etc. The vehicle control system(s) 138 can generate specific control signals for the autonomous vehicle 102 (e.g., adjust steering, braking, velocity, and so on). The specific control signals can cause the autonomous vehicle 102 to move in accordance with the selected trajectory. The vehicle controller 142 can have other functions such as, for example, safely transitioning the mode and/or state of the vehicle, as described herein.

The vehicle controller can serve as an interface between the autonomy computing system 120 and the autonomous vehicle 102 itself. In some examples, the vehicle controller 142 can include multiple control lanes. In some examples, the vehicle controller 142 can have a dual-lane control architecture. The vehicle controller 142 can include a first control lane and a second control lane. Each lane control can constitute a full system that can be used to receive signals from the autonomy computing system 120 system, track the current state of the autonomous vehicle 102, and transmit control signals from the autonomy computing system 120 to the vehicle control system(s) 138.

The vehicle controller 142 can include a variety of different systems not pictured in FIG. 1 including a vehicle health monitor system, a vehicle operator and rider interface, a vehicle dynamics monitor, an input side and output side low-level control and estimation system, a pose management system, a trajectory management system, a motion control system, a fault management system, a unit help monitor system, a vehicle mode management system, an application power management system, and vehicle controller power management system.

The vehicle health monitor system can collect information about the degradation of the vehicle including any damage or wear and tear to the autonomous vehicle 102 that has been measured or detected by an onboard detection or analysis system. The vehicle operator interface can monitor the safety operator interface and the rider interface to ensure that the operator and riders are safe and able to communicate if needed. The vehicle dynamics monitor system can measure various vehicle responses to inputs or controls to determine whether or not the autonomous vehicle 102 is properly monitoring and responding to input provided by the various input sources.

The fault management system can receive information from the vehicle health monitor system, the vehicle operator and rider interface, the unit health monitor system, vehicle dynamics monitor to determine when a fault occurs with the autonomous vehicle 102. The fault management system can log any events that occur for later diagnosis. In some examples, the fault management system can receive information from the unit health monitor which can monitor the autonomous vehicle 102 for any device faults.

The low-level control estimation system can perform a variety of tasks including estimating the current friction levels experienced by the autonomous vehicle 102, estimating the capability of the autonomous vehicle 102, performing collision mitigation arbitration, switch direct drive, both as input and output to the vehicle controller 142, etc. The pose management system can receive information from the low-level control and estimation system to consider the plausibility of a variety of poses and estimate their probability. The pose management system can also estimate the current state of the autonomous vehicle 102. The motion control system can have longitudinal and lateral control of the autonomous vehicle 102 and control the direction of motion handling.

The vehicle mode management system can be utilized to implement the improved mode transition techniques of the present disclosure, as will be further described herein. For instance, each control lane of the vehicle controller 142 can include a vehicle mode management system (or mode manager). A vehicle mode management system can receive various input from a variety of sources such as, for example, the fault management system, the human machine interface(s) 140 (e.g., a physical key interface, user device, etc. associated therewith), a rider system interface, etc. to determine the current mode of the vehicle controller. The vehicle controller 142 can communicate with the service provider to ensure that the vehicle controller mode matches the service provider's current state for the autonomous vehicle 102. The application power management system can, in coordination with the vehicle controller power management system, power up and down the vehicle controller 142, the autonomous vehicle 102, and the autonomy computing system 120. The vehicle controller 142 (e.g., the vehicle mode management system) can monitor, manage, and control the mode of the autonomous vehicle 102.

The autonomous vehicle 102 can include a vehicle controller 142 configured to translate the motion plan data 134 into instructions. By way of example, the vehicle controller 142 can translate a determined motion plan data 134 into instructions for controlling the vehicle 102 including adjusting the steering of the vehicle 102 "X" degrees and/or applying a certain magnitude of braking force. The vehicle controller 142 can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a passenger seat in the back of the vehicle).

Figure 2:
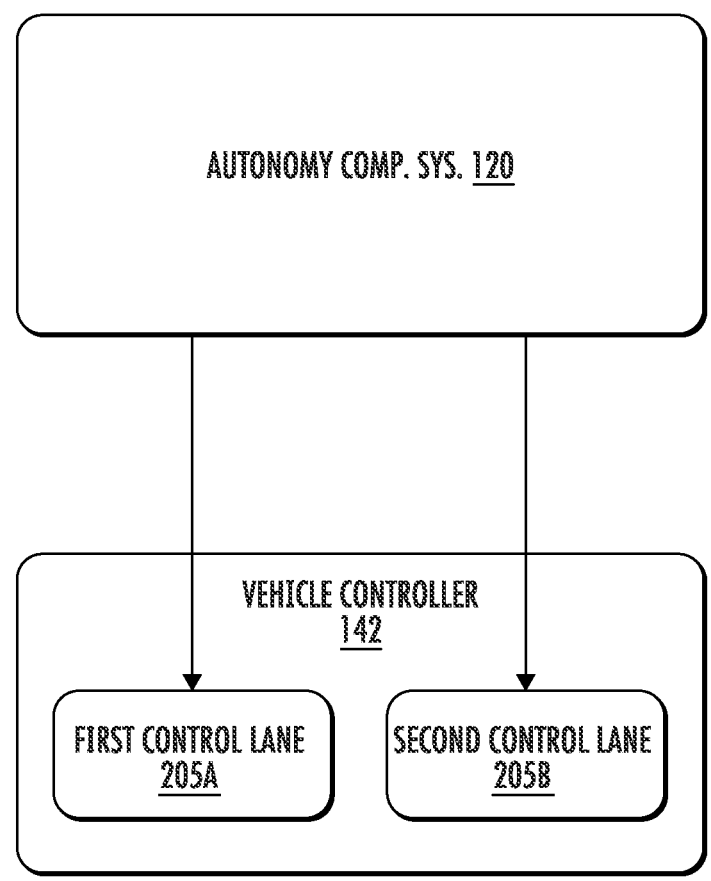
FIG. 2 depicts a block diagram of a vehicle controller according to example embodiments of the present disclosure.

FIG. 2 depicts a block diagram of a vehicle controller 142 according to example embodiments of the present disclosure. As shown in FIG. 2, the autonomy computer system 120 can connect to the vehicle controller 142. The vehicle controller 142 can include a first control lane 205A and a second control lane 205B. Each control lane can include a full system for monitoring or controlling the current state of the autonomous vehicle, among other duties.

According to an aspect of the present disclosure, the vehicle controller 142 can control the autonomous driving system to provide data representing a motion plan and data representing a dynamic state of the autonomous vehicle (e.g., autonomous vehicle 102 in FIG. 1) to the first control lane 205A and the second control lane 205B simultaneously. Thus, the first control lane 205A and the second control lane 205B can both represent the current state of the autonomous vehicle.

According to an aspect of the present disclosure, the vehicle controller 142 can designate one of the first control lane 205A or the second control lane 205B as a primary lane, and the other as a secondary lane (e.g., based on a capability of the first control lane 205A and a capability of the second control lane 205B). The vehicle controller 142 can use the primary lane to control vehicle 102 so that both the first control lane 205A and the second control lane 205B are not simultaneously attempting to control the same operation of the autonomous vehicle 102.

In some examples, the first control lane 205A can determine that a request to switch states has been generated. The first control lane 205A may ensure that the second control lane 205B also transitions to the new state as part of the process to switch states. In this way, if the first control lane 205A fails, or control needs to be transferred to the second control lane 205B for any reason, the second control lane 205B has an accurate internal representation of the state of the autonomous vehicle 102.

Figure 3:
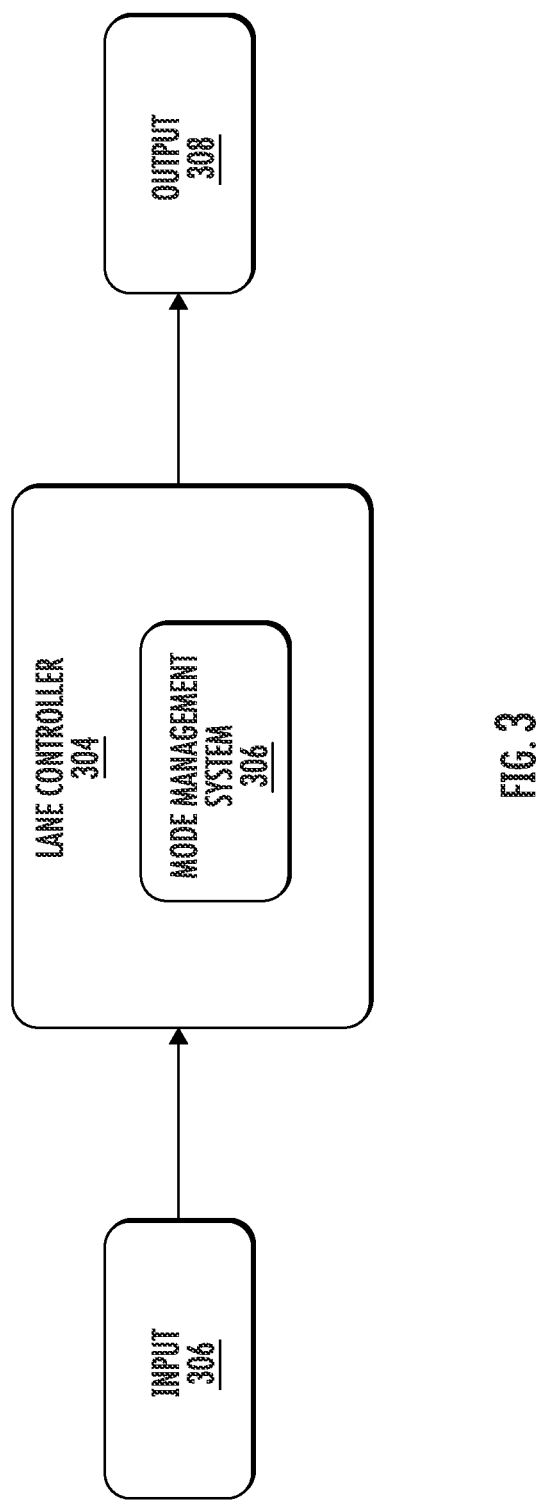
FIG. 3 depicts a block diagram of a vehicle controller according to example embodiments of the present disclosure.

FIG. 3 depicts a block diagram of a lane controller 304 according to example embodiments of the present disclosure. In this example, the lane controller 304 can be included in a vehicle controller (e.g., vehicle controller 142 in FIGS. 1 and/or 2). Lane controller 304 can receive input data 302, process the input data 302, and output the results 308. In some examples, the lane controller 304 can include a mode management system 306 to, in response to the input data 302, update the current mode of the autonomous vehicle (e.g., autonomous vehicle 102 in FIG. 1).

The mode management system 306 can be utilized to implement the improved mode transition techniques of the present disclosure, as will be further described herein. For instance, each control lane (e.g., the first control lane 205A and/or the second control lane 205B depicted in FIG. 2) of the vehicle controller (e.g., vehicle controller 142 in FIGS. 1 and/or 2) can include a mode management system 306 (or mode manager). A mode management system 306 can receive various input from a variety of sources such as, for example, the vehicle operator (e.g., a physical key interface, user device, etc. associated therewith), a passenger system interface, and so on. The input can be used to determine the current mode of the vehicle controller (e.g., vehicle controller 142 in FIGS. 1 and/or 2). The vehicle controller (e.g., vehicle controller 142 in FIGS. 1 and/or 2) can communicate with a service provider (e.g., a computing system associated therewith) to ensure that the vehicle controller mode matches the mode of the autonomous vehicle (e.g., autonomous vehicle 102 in FIG. 1) itself.

The mode management system 306 included in the vehicle controller (e.g., vehicle controller 142 in FIGS. 1 and/or 2) can monitor, manage, and control the mode of the autonomous vehicle. A state machine can be implemented by the mode management system 306. The vehicle controller (e.g., vehicle controller 142 in FIGS. 1 and/or 2) can also ensure that the primary control lane (e.g., first control lane 205A in FIG. 2) and the secondary control lane (e.g., second control lane 205B in FIG. 2) synchronize (e.g. have the same state) and both synchronize with the state of the autonomous vehicle (e.g., autonomous vehicle 102 in FIG. 1) itself. Thus, each time the mode management system 306 changes from one mode to another or from one state to another, the mode management system 306 can confirm the mode change with the autonomy computing system (e.g., autonomous computing system 120 of FIG. 1) of the autonomous vehicle (e.g., autonomous vehicle 102 in FIG. 1). If the autonomy computing system (e.g., autonomous computing system 120 of FIG. 1) does not confirm or authorize the change in mode or state, the mode management system 306 can remain in the previous state.

Figure 4:
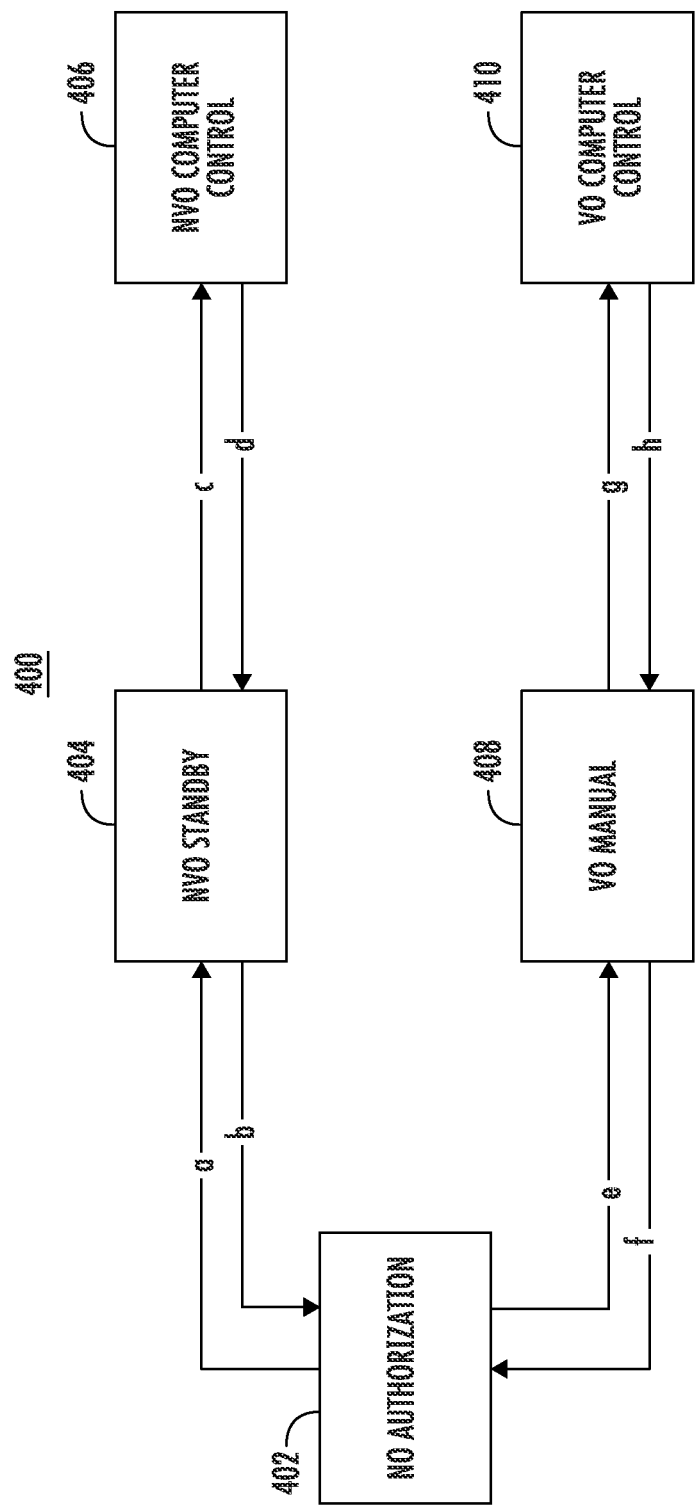
FIG. 4 depicts a state machine for mode transition management according to example embodiments of the present disclosure.

FIG. 4 depicts a state machine 400 for mode transition management according to example embodiments of the present disclosure. The state machine 400 can represent the possible states for the autonomous vehicle (e.g., autonomous vehicle 102 in FIG. 1) (or its associated mode management system (e.g., mode management system 306 in FIG. 3)) and the transitions between different modes.

When the vehicle controller (e.g., vehicle controller 142 in FIGS. 1 and/or 2) (along with the rest of the autonomous vehicle (e.g., autonomous vehicle 102 in FIG. 1)) boots up (or powers on), the vehicle controller (e.g., vehicle controller 142 in FIGS. 1 and/or 2) can initialize the vehicle into an initial no authorization state 402. The no authorization state 402 can be outside of either the first mode of operations or the second mode of operations. The first mode of operations can be a mode in which no operator is present in the autonomous vehicle (e.g., autonomous vehicle 102 in FIG. 1). The second mode of operations can be a mode in which an operator is present in the autonomous vehicle (e.g., autonomous vehicle 102 in FIG. 1). Instead, the no authorization state 402 can operate as a neutral state in which the autonomous vehicle (e.g., autonomous vehicle 102 in FIG. 1) does not take any actions and waits for an authorization request.

The vehicle controller (e.g., vehicle controller 142 in FIGS. 1 and/or 2) can receive an authorization request. The authorization requests can come from one of a plurality of different sources. For example, the authorization request can be generated by a system within the autonomous vehicle (e.g., autonomous vehicle 102 in FIG. 1) itself (e.g., the autonomy system 120 in FIG. 1), a remote computing system associated with the autonomous vehicle (e.g., a services system that manages a ridesharing service), or a physical key interface (e.g., via a user physically inserting a key or key-like device into the autonomous vehicle (e.g., autonomous vehicle 102 in FIG. 1) to initiate the autonomous vehicle into a drivable mode).

In response to receiving an authorization request, the vehicle controller (e.g., vehicle controller 142 in FIGS. 1 and/or 2) can determine whether the request includes a request to enter a first mode of operations or a request to enter a second mode of operations. The first mode of operations and the second mode of operations are distinct modes such that when the autonomous vehicle (e.g., autonomous vehicle 102 in FIG. 1) is in either of the modes, the vehicle controller cannot change to a state associated with the other mode without first returning to the no authorization state 402.

The first mode of operations can be a mode in which no operator is present in the autonomous vehicle (e.g., autonomous vehicle 102 in FIG. 1). While in this first mode of operations, any user interaction with the autonomous vehicle (e.g., autonomous vehicle 102 in FIG. 1) can be ignored. When the vehicle controller (e.g., vehicle controller 142 in FIGS. 1 and/or 2) determines that an authorization request includes a request to enter the first mode of operations, the vehicle controller (e.g., vehicle controller 142 in FIGS. 1 and/or 2) can cause the mode of the autonomous vehicle (e.g., autonomous vehicle 102 in FIG. 1) to transition (at a) to the first mode of operations and enter a standby state 404 (labeled as NVO standby). As noted above, before entering the first mode of operations, the vehicle controller (e.g., vehicle controller 142 in FIGS. 1 and/or 2) can transmit a request to the autonomous vehicle (e.g., autonomous vehicle 102 in FIG. 1) to determine whether the autonomous vehicle (e.g., autonomous vehicle 102 in FIG. 1) is prepared to enter the first mode of operations. When the vehicle controller receives confirmation that the autonomous vehicle (e.g., autonomous vehicle 102 in FIG. 1) is prepared to enter the first mode of operations, the vehicle controller (e.g., vehicle controller 142 in FIGS. 1 and/or 2) can change the mode of the autonomous vehicle (e.g., autonomous vehicle 102 in FIG. 1) and enter the standby state 404.

The standby state 404 can be a state in which the autonomous vehicle (e.g., autonomous vehicle 102 in FIG. 1) can prepare to enter a full computer-controlled state 406. While in a standby state 404, the autonomous vehicle (e.g., autonomous vehicle 102 in FIG. 1) can be immobile and cannot react to user input. Once the autonomous vehicle (e.g., autonomous vehicle 102 in FIG. 1) has signaled its readiness to transition (at c) into the full computer-controlled state 406, the vehicle controller (e.g., vehicle controller 142 in FIGS. 1 and/or 2) can wait for a state transition request from the autonomy system (e.g., autonomy computing system 120 in FIG. 1) or from a remote computing system (e.g., remote computing system 106 in FIG. 1). In some examples, the state transition request can be received from the autonomy system associated with the autonomous vehicle (e.g., autonomous vehicle 102 in FIG. 1). In some examples, the state transition request can be received from a remote server system that controls or is associated with the autonomous vehicle (e.g., autonomous vehicle 102 in FIG. 1).

Alternatively, the vehicle controller (e.g., vehicle controller 142 in FIGS. 1 and/or 2) can automatically transition (at c) from the standby state 404 into the full computer-controlled state 406 once the autonomous vehicle (e.g., autonomous vehicle 102 in FIG. 1) has signaled its readiness to transition to computer control without the need for an additional state transition request.

Once the vehicle controller (e.g., vehicle controller 142 in FIGS. 1 and/or 2) has transitioned to the computer-controlled state 406, the autonomous vehicle (e.g., autonomous vehicle 102 in FIG. 1) can be completely controlled by the autonomy system (e.g., autonomy computing system 120 in FIG. 1) associated with the autonomous vehicle (e.g., autonomous vehicle 102 in FIG. 1). Actions taken by the autonomous vehicle (e.g., autonomous vehicle 102 in FIG. 1) can be in response to commands generated by the autonomy system. In some implementations, a remote system (e.g., remote assistance system) can override the autonomy system to remotely assist the autonomous vehicle (e.g., autonomous vehicle 102 in FIG. 1). While in the computer-controlled state 406, the vehicle controller (e.g., vehicle controller 142 in FIGS. 1 and/or 2) can receive a state transition request. The state transition request can request that the autonomous vehicle (e.g., autonomous vehicle 102 in FIG. 1) leave the computer-controlled state 406 and transition (at d) back to the standby state 404. Note that the state machine is configured such that the only state that can be reached from the computer-controlled state 406 is the standby state 404.

In some examples, the autonomous vehicle (e.g., autonomous vehicle 102 in FIG. 1) can ensure that movement has ceased before entering the standby state 404. Thus, when a state transition request is received by the vehicle controller (e.g., vehicle controller 142 in FIGS. 1 and/or 2), the autonomous vehicle (e.g., autonomous vehicle 102 in FIG. 1) can be instructed by the autonomy system (e.g., autonomous computing system 120 in FIG. 1) or by the vehicle controller (e.g., vehicle controller 142 in FIGS. 1 and/or 2) itself to take actions that will bring it to a stop. As with all other state transitions, the vehicle controller (e.g., vehicle controller 142 in FIGS. 1 and/or 2) can synchronize that intent to change state with the service provider and between the control lanes. Once the intended transition is synchronized between all relevant components, the vehicle controller (e.g., vehicle controller 142 in FIGS. 1 and/or 2) can transition (at d) the autonomous vehicle (e.g., autonomous vehicle 102 in FIG. 1) from the computer-controlled state 406 to the standby state 404.

Once in the standby state 404, the vehicle controller (e.g., vehicle controller 142 in FIGS. 1 and/or 2) can receive a transition request to transition (at b) into the no authorization state 402. If a request to transition into the second mode of operations is received while in the standby state 404, the vehicle controller (e.g., vehicle controller 142 in FIGS. 1 and/or 2) can transition (at b) to the no authorization state 402 before transitioning into the second mode of operations. In this way, the vehicle controller (e.g., vehicle controller 142 in FIGS. 1 and/or 2) can ensure that the autonomous vehicle (e.g., autonomous vehicle 102 in FIG. 1) does not transition directly between the first and second mode of operations.

In some examples, the autonomous vehicle (e.g., autonomous vehicle 102 in FIG. 1) can power down and restart so that it reinitializes into the no authorization state 402 before transitioning into the second mode of operations. Alternatively, once in the standby state 404, the vehicle controller (e.g., vehicle controller 142 in FIGS. 1 and/or 2) can transition to the no authorization state 402 without powering down and, while in the no authorization state, receive authorization to transition into the second mode of operations.

When the vehicle controller receives an authorization request and determines that the request is to enter the second mode of operations, the vehicle controller (e.g., vehicle controller 142 in FIGS. 1 and/or 2) can transition (at e) into a user control state such as, for example, manual-controlled state 408. Such transition can be conditioned on the vehicle controller (e.g., vehicle controller 142 in FIGS. 1 and/or 2) synchronizing with the autonomous vehicle (e.g., autonomous vehicle 102 in FIG. 1) itself and any other control lanes. While in the manual-controlled state 408, an operator can operate the in-vehicle controls to operate the autonomous vehicle (e.g., autonomous vehicle 102 in FIG. 1).

In some examples, while in the manual-controlled state 408, the vehicle controller (e.g., vehicle controller 142 in FIGS. 1 and/or 2) can receive a request to enter full computer control 410. In response to the request, the vehicle controller (e.g., vehicle controller 142 in FIGS. 1 and/or 2) can, once it has synchronized with one or more other components, transition (g) from the manual-controlled state 408 to the full computer control state 410. The computer-controlled state 410 associated with the second mode of operations is distinct from the full computer-controlled state 406 associated with the first mode of operations. For example, in the first mode of operations, the computer controller (e.g., vehicle controller 142 in FIGS. 1 and/or 2) can ignore any human intervention and cannot transition into an operator-controlled state. In contrast, the computer-controlled state 410 associated with the second mode of operations can transition into an operator-controlled state 408 upon request and can be responsive to user input. For example, if a user presses the brake pedal, the vehicle controller (e.g., vehicle controller 142 in FIGS. 1 and/or 2) can respond by transitioning (at h) out of the computer-controlled state 410 and re-engaging the operator control state 408.

While in the computer-controlled state 410 associated with the second mode of operations, the vehicle controller (e.g., vehicle controller 142 in FIGS. 1 and/or 2) can receive a request to transition out of the computer-controlled state 410 into a manual-controlled state 408. As noted above, this request can be generated by user interaction with the autonomous vehicle (e.g., autonomous vehicle 102 in FIG. 1), by the autonomy system (e.g., autonomous computing system 120 in FIG. 1), or by a remote computing system directing the autonomous vehicle (e.g., autonomous vehicle 102 in FIG. 1) to return to an operator control state 408.

While in the manual-controlled state, the vehicle controller (e.g., vehicle controller 142 in FIGS. 1 and/or 2) can receive a request to transition into the no authorization state 402. This request can be part of a request to transition to the first mode of operations or can be included in a request to stop operations and power down. The vehicle controller (e.g., vehicle controller 142 in FIGS. 1 and/or 2) can establish that both the service provider and the control lanes are aware of the transition request and confirm that the transition is authorized. The vehicle controller (e.g., vehicle controller 142 in FIGS. 1 and/or 2) can transition (at f) to the no authorization state 402.

Figure 5:
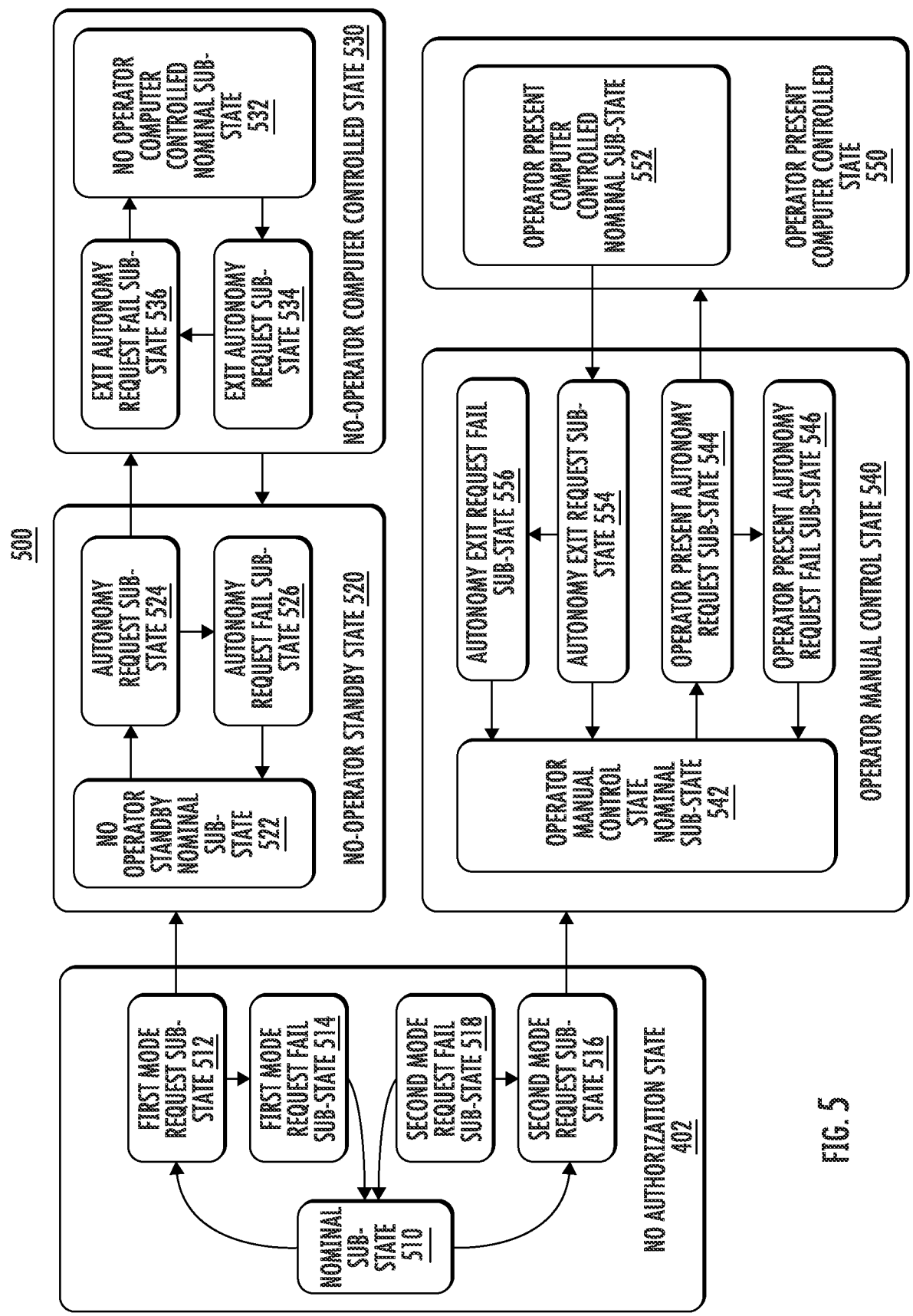
FIG. 5 depicts a state machine for mode transition management according to example embodiments of the present disclosure.

FIG. 5 depicts a detailed state machine 500 for mode transition management according to example embodiments of the present disclosure. For example, each state (e.g., states 402 404, 406, 408, 410 described in FIG. 4) of the state machine 500 can have one or more sub-states that facilitate a smooth transition between the states. The following provides a description of the possible example sub-states and how the state machine can transition between the states and each sub-state. By way of example, the no authorization state 402 can include a plurality of possible sub-states (e.g., 510, 512, 514, 516, 518, etc.). A first sub-state can be a nominal sub-state 510 in which the vehicle controller (e.g., vehicle controller 142 in FIGS. 1 and/or 2) has not yet received an authorization request.

The vehicle controller (e.g., vehicle controller 142 in FIGS. 1 and/or 2 and 2) can transition into a subsequent sub-state in response to receiving an authorization request. For example, the vehicle controller can enter a first mode request sub-state 512 if the request is to enter the first mode of operations or a second mode request sub-state 516 if the request is to enter the second mode of operations.

In both the first mode request sub-state 512 and the second mode request sub-state 516, the vehicle controller (e.g., vehicle controller 142 in FIGS. 1 and/or 2) can request authorization from a third party (e.g., the service provider) to ensure that the autonomous vehicle (e.g., autonomous vehicle 102 in FIG. 1) is prepared to transition into another state. If the vehicle controller (e.g., vehicle controller 142 in FIGS. 1 and/or 2) receives an acknowledgment or authorization to transition into the requested mode, the vehicle controller (e.g., vehicle controller 142 in FIGS. 1 and/or 2) can transition the state from the first mode request sub-state 512 to the no operator standby state 520 if entry into the first mode of operations was requested or from the second mode request sub-state 516 into the operator manual control state 540 if entry into the second mode of operations was requested.

However, if no acknowledgment or response is received within a predetermined time frame, the vehicle controller (e.g., vehicle controller 142 in FIGS. 1 and/or 2) may not transition into the desired mode of operation and instead can transition into a state representing a potential failure. For example, if, while in the first mode request sub-state 512 and awaiting transition into the first mode of operations, the vehicle controller (e.g., vehicle controller 142 in FIGS. 1 and/or 2) exceeds the allotted time for receiving acknowledgment, the vehicle controller (e.g., vehicle controller 142 in FIGS. 1 and/or 2) can transition into a first mode request fail sub-state 514. The first mode request fail sub-state 514, for example, can represent a potential failure to transition.

The second mode request fail sub-state 518 can perform the same or similar role for failure to transition into the second mode of operations. While in the first mode request fail sub-state 514 or the second mode request fail sub-state 518, the vehicle controller (e.g., vehicle controller 142 in FIGS. 1 and/or 2) can transition into the first mode operations or the second mode of operations (depending on which was requested) if the authorization request is successful (e.g., the vehicle controller (e.g., vehicle controller 142 in FIGS. 1 and/or 2) receives an acknowledgment of the intent of the autonomous vehicle (e.g., autonomous vehicle 102 in FIG. 1) to transition states). However, if no acknowledgment is received within the predetermined time frame, the vehicle controller (e.g., vehicle controller 142 in FIGS. 1 and/or 2) can transition back to the nominal sub-state 510 and await a new authorization request.

Similarly when first entering the no-operator standby state 520, the initial sub-state can be a no operator standby nominal sub-state 522 in which the vehicle controller (e.g., vehicle controller 142 in FIGS. 1 and/or 2) waits to receive a state transition request to enter the no operator computer-controlled state 530. When the vehicle controller (e.g., vehicle controller 142 in FIGS. 1 and/or 2) receives a request to transition into the no operator computer-controlled state 530, the vehicle controller (e.g., vehicle controller 142 in FIGS. 1 and/or 2) can ensure that the intent to state switch matches the intent of one or more other control lanes, either locally or remotely. For example, before transitioning to another sub-state within the no operator standby state 520, the vehicle controller (e.g., vehicle controller 142 in FIGS. 1 and/or 2) can request information from one or more other systems to ensure that all the mode controllers (e.g., mode managers of other control lanes) have a matching intent to transition to the no operator computer-controlled state 530.

The vehicle controller (e.g., vehicle controller 142 in FIGS. 1 and/or 2) can transition to an autonomy request sub-state 524 in which the vehicle controller (e.g., vehicle controller 142 in FIGS. 1 and/or 2) requests entry into the no operator computer-controlled state 530 from the autonomous vehicle (e.g., autonomous vehicle 102 in FIG. 1) itself. This can occur, for example, once the vehicle controller (e.g., vehicle controller 142 in FIGS. 1 and/or 2) has confirmed matching intent among control lanes. While in the autonomy request sub-state 524 the vehicle controller (e.g., vehicle controller 142 in FIGS. 1 and/or 2) can wait for confirmation from the autonomous vehicle (e.g., autonomous vehicle 102 in FIG. 1) before transitioning into no operator computer-controlled state 530. If the confirmation is not received within a predetermined time, the vehicle controller (e.g., vehicle controller 142 in FIGS. 1 and/or 2) can enter an autonomy request failure sub-state 526. If, while in this failure state, a delayed confirmation arrives, the vehicle controller (e.g., vehicle controller 142 in FIGS. 1 and/or 2) can transition to the no operator computer-controlled state 530. However, if no confirmation arrives, the vehicle controller (e.g., vehicle controller 142 in FIGS. 1 and/or 2) can transition back to the no operator standby nominal sub-state 522 to await further state transition requests.

While in the no operator computer-controlled state 530, the vehicle controller (e.g., vehicle controller 142 in FIGS. 1 and/or 2) can initially transition into a no operator computer-controlled nominal sub-state 532 associated with the no operator computer-controlled state 530. The vehicle controller (e.g., vehicle controller 142 in FIGS. 1 and/or 2) can remain in this state until a transition request is received to transition back to the no operator standby state 520. As above, the vehicle controller (e.g., vehicle controller 142 in FIGS. 1 and/or 2) can enter the exit autonomy request sub-state 534 to request authorization from the autonomous vehicle (e.g., autonomous vehicle 102 in FIG. 1) to transition to the no operator standby state 520 once it has received the state transition request. If confirmation is received within a predetermined time, the vehicle controller (e.g., vehicle controller 142 in FIGS. 1 and/or 2) can transition to the no-operator standby state 520. However, if no confirmation is received within a predetermined time, the vehicle controller (e.g., vehicle controller 142 in FIGS. 1 and/or 2) can enter an exit autonomy request fail sub-state 536 while waiting for a delayed confirmation. If no delayed confirmation is forthcoming, the vehicle controller (e.g., vehicle controller 142 in FIGS. 1 and/or 2) can transition back into the no operator computer-controlled nominal sub-state 532 associated with the no operator computer-controlled state 530 and await further requests.

If the request is a request to enter the second mode of operations, the vehicle controller (e.g., vehicle controller 142 in FIGS. 1 and/or 2) can transition to the operator manual control state 540. While in the operator manual control state 540, the vehicle controller (e.g., vehicle controller 142 in FIGS. 1 and/or 2) can first enter into an operator manual control state nominal sub-state 542 wherein the vehicle controller (e.g., vehicle controller 142 in FIGS. 1 and/or 2) waits to receive a request to transition into the operator present computer-controlled state 550 associated with the second mode of operations. The vehicle controller (e.g., vehicle controller 142 in FIGS. 1 and/or 2) can remain in this state until a transition request is received to transition to the operator present computer-controlled state 550. As with other state transitions, the vehicle controller (e.g., vehicle controller 142 in FIGS. 1 and/or 2) can request authorization from the autonomous vehicle (e.g., autonomous vehicle 102 in FIG. 1) to transition to the operator present computer-controlled state 550 by transitioning into the operator present autonomy request sub-state 544 once it has received the state transition request. If confirmation is received within a predetermined time, the vehicle controller (e.g., vehicle controller 142 in FIGS. 1 and/or 2) can transition to the operator present computer-controlled state 550. However, if no confirmation is received within a predetermined time, the vehicle controller (e.g., vehicle controller 142 in FIGS. 1 and/or 2) can enter an operator present autonomy request fail sub-state 546 while waiting for a delayed confirmation. If no delayed confirmation is forthcoming, the vehicle controller (e.g., vehicle controller 142 in FIGS. 1 and/or 2) can transition back into the operator manual control nominal sub-state 542 associated with the operator manual control state 540 and await further requests.

In the operator present computer-control state 550, the vehicle controller (e.g., vehicle controller 142 in FIGS. 1 and/or 2) can enter an operator present computer controlled nominal sub-state 552 while waiting to receive a state transition request. When receiving a state transition request while in the operator present computer-controlled nominal sub-state 552 associated with the second mode of operation, the vehicle controller (e.g., vehicle controller 142 in FIGS. 1 and/or 2) can immediately transition to the operator manual-controlled state 540. Once in that operator manual-controlled state 540, the vehicle controller (e.g., vehicle controller 142 in FIGS. 1 and/or 2) can enter an autonomy exit request sub-state 554 to request authorization for the state transition and confirm that state synchronization was preserved. If no authorization is forthcoming, the vehicle controller (e.g., vehicle controller 142 in FIGS. 1 and/or 2) can enter the autonomy exit request fail sub-state 556. If no authorization is received, the vehicle controller (e.g., vehicle controller 142 in FIGS. 1 and/or 2) can transition to the operator manual control state nominal sub-state 542 to await further requests.

Figure 6:
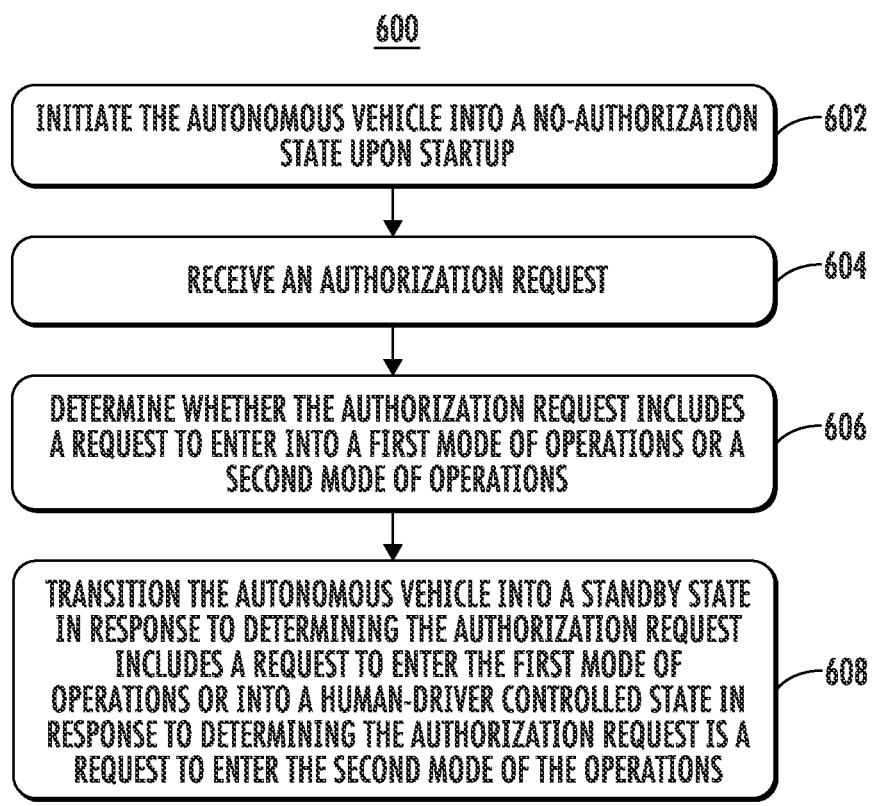
FIG. 6 depicts a flow chart diagram of an example method according to example embodiments of the present disclosure.

FIG. 6 depicts a flow chart diagram of an example method 600 according to example embodiments of the present disclosure. One or more portion(s) of the method 600 can be implemented by one or more computing devices such as, for example, the computing devices described herein. Moreover, one or more portion(s) of the method 600 can be implemented as an algorithm on the hardware components of the device(s) described herein. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method 600 can be implemented by one or more computing devices, such as one or more of the computing devices depicted in FIGS. 1-3.

A vehicle controller (e.g., vehicle controller 142 in FIGS. 1 and/or 2) can initiate, at 602, an autonomous vehicle into a no-authorization state upon startup. The vehicle controller (e.g., vehicle controller 142 in FIGS. 1 and/or 2) can receive, at 604, an authorization request. The authorization request can be associated with an autonomy computing system (e.g., autonomy computing system 120 in FIG. 1) onboard the autonomous vehicle (e.g., autonomous vehicle 102 in FIG. 1). The authorization request can be communicated from a remote computing system (e.g., remote computing device(s) in FIG. 1) that is remote from the autonomous vehicle (e.g., autonomous vehicle 102 in FIG. 1). In some implementations, the authorization request can be associated with a physical key interface.

The vehicle controller (e.g., vehicle controller 142 in FIGS. 1 and/or 2) can determine whether, at 606, the authorization request includes a request to authorization entry into a first mode of operations or a second mode of operations, wherein the first mode of operations is associated with an autonomous vehicle without a human operator and the second mode of operations is associated with an autonomous vehicle that includes a human operator.

The vehicle controller (e.g., vehicle controller 142 in FIGS. 1 and/or 2) can transition, at 608, the autonomous vehicle (e.g., autonomous vehicle 102 in FIG. 1) into a standby state in response to determining the authorization request includes a request to enter the first mode of operations or into a manual-controlled state in response to determining the authorization request is a request to enter the second mode of operations. While in the first mode of operations, the autonomous vehicle (e.g., autonomous vehicle 102 in FIG. 1) may not respond to operator input.

While in the standby state, the vehicle controller (e.g., vehicle controller 142 in FIGS. 1 and/or 2) can receive a request to transition into a first computer-controlled state. In response to receiving the request, the vehicle controller (e.g., vehicle controller 142 in FIGS. 1 and/or 2) can determine that the autonomous vehicle (e.g., autonomous vehicle 102 in FIG. 1) is prepared to enter the first computer-controlled state. In response to determining that the autonomous vehicle (e.g., autonomous vehicle 102 in FIG. 1) is prepared to enter the first computer-controlled mode, the vehicle controller (e.g., vehicle controller 142 in FIGS. 1 and/or 2) can transition from the standby state to a first computer-controlled state.

While in the first computer-controlled state, the vehicle controller (e.g., vehicle controller 142 in FIGS. 1 and/or 2) can receive, from the autonomous system, a request to exit the first computer-controlled state. The vehicle controller (e.g., vehicle controller 142 in FIGS. 1 and/or 2) can transmit controls to the autonomous vehicle (e.g., autonomous vehicle 102 in FIG. 1) that cause the autonomous vehicle (e.g., autonomous vehicle 102 in FIG. 1) to come to a safe stopping point and become immobile. In response to determining that the autonomous vehicle (e.g., autonomous vehicle 102 in FIG. 1) has become immobile, the vehicle controller (e.g., vehicle controller 142 in FIGS. 1 and/or 2) can transition from the first computer control state to the standby state.

While in the standby state, the vehicle controller (e.g., vehicle controller 142 in FIGS. 1 and/or 2) can receive a request to transition to the second mode of operations. The vehicle controller (e.g., vehicle controller 142 in FIGS. 1 and/or 2) can transition from the standby state to the no-authorization state. Alternatively, the vehicle controller (e.g., vehicle controller 142 in FIGS. 1 and/or 2) can transmit a command to cause the autonomous vehicle (e.g., autonomous vehicle 102 in FIG. 1) to power down and reboot into the no-authorization state.

While in the manual-controlled state, the vehicle controller (e.g., vehicle controller 142 in FIGS. 1 and/or 2) can receive a request to transition into a second computer-controlled state. The vehicle controller (e.g., vehicle controller 142 in FIGS. 1 and/or 2) can determine that the autonomous vehicle (e.g., autonomous vehicle 102 in FIG. 1) is prepared to enter the second computer-controlled state. In response to determining that the autonomous vehicle (e.g., autonomous vehicle 102 in FIG. 1) is prepared to enter the second computer-controlled state, the vehicle controller (e.g., vehicle controller 142 in FIGS. 1 and/or 2) can transition from the manual-controlled state to the second computer-controlled state.

The vehicle controller (e.g., vehicle controller 142 in FIGS. 1 and/or 2) can transmit a state transition request to the autonomous vehicle (e.g., autonomous vehicle 102 in FIG. 1), the state transition request including information describing the planned transition to the second computer-controlled state. The vehicle controller (e.g., vehicle controller 142 in FIGS. 1 and/or 2) can receive a confirmation that the autonomous vehicle (e.g., autonomous vehicle 102 in FIG. 1) has updated an autonomous vehicle state to the second computer-controlled state. In response to receiving a confirmation that the autonomous vehicle (e.g., autonomous vehicle 102 in FIG. 1) has updated the autonomous vehicle state to the second computer-controlled state, the vehicle controller (e.g., vehicle controller 142 in FIGS. 1 and/or 2) can update a vehicle controller state to the second computer-controlled state.

The vehicle controller (e.g., vehicle controller 142 in FIGS. 1 and/or 2) can determine whether a confirmation has been received from the autonomous vehicle (e.g., autonomous vehicle 102 in FIG. 1) within a predetermined time limit. In response to determining that a confirmation has not been received from the autonomous vehicle (e.g., autonomous vehicle 102 in FIG. 1) within the predetermined time limit, the vehicle controller (e.g., vehicle controller 142 in FIGS. 1 and/or 2) can enter an error or failure state and remain in the original state.

While in the second computer-controlled state, the vehicle controller (e.g., vehicle controller 142 in FIGS. 1 and/or 2) can detect operator input to the autonomous vehicle (e.g., autonomous vehicle 102 in FIG. 1). In response to detecting operator input, the vehicle controller (e.g., vehicle controller 142 in FIGS. 1 and/or 2) can transition from the second computer-controlled state to the manual-controlled state.

While in the manual-controlled state, the vehicle controller (e.g., vehicle controller 142 in FIGS. 1 and/or 2) can receive a request to transition to the first mode of operations. The vehicle controller (e.g., vehicle controller 142 in FIGS. 1 and/or 2) can transmit a command to cause the autonomous vehicle (e.g., autonomous vehicle 102 in FIG. 1) to power down and reboot into the no-authorization state.

In some examples the vehicle controller (e.g., vehicle controller 142 in FIGS. 1 and/or 2) can include a first control lane and a second control lane. The vehicle controller (e.g., vehicle controller 142 in FIGS. 1 and/or 2) can facilitate the transition into the standby state by, for example, confirming that the first control lane and the second control lane both indicate a transition to the standby state. In another example, the vehicle controller (e.g., vehicle controller 142 in FIGS. 1 and/or 2) can facilitate a transition into the manual-controlled state by, for example, confirming that the first control lane and the second control lane both indicate a transition to the manual-controlled state.

Figure 7:
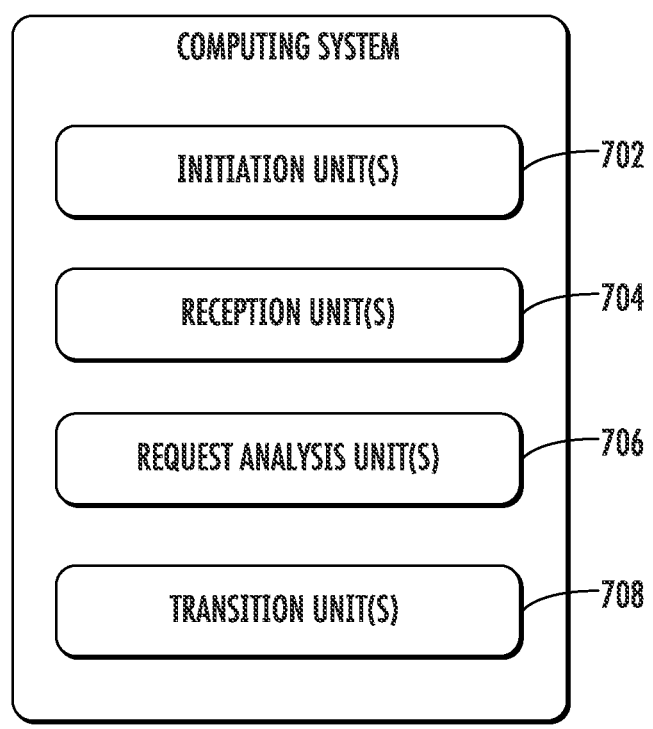
FIG. 7 depicts an example system with units for performing operations and functions according to example aspects of the present disclosure.

FIG. 7 depicts an example system with units for performing operations and functions according to example aspects of the present disclosure. Various means can be configured to perform the methods and processes described herein. For example, a computing system can include initiation unit(s) 702, reception unit(s) 704, request analysis unit(s) 706, transition unit(s) 708, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to initiate the autonomous vehicle into a no-authorization state upon startup. For example, the vehicle controller can, upon startup, set the initial state of the autonomous vehicle to the no authorization state that is associated with neither the first mode of operations nor the second mode of operations. An initiation unit 702 is one example of a means for initiating the autonomous vehicle into a no-authorization state upon startup.

The means can be configured to receive an authorization request. For example, the vehicle controller can receive an authorization request from an autonomy system associated with the autonomous vehicle, a remote computing system, or a physical key interface. A reception unit 704 is one example of a means for receiving an authorization request.

The means can be configured to determine whether the authorization request includes a request to enter into a first mode of operations or a second mode of operations, wherein the first mode of operations is associated with the autonomous vehicle being operated without a human operator and the second mode of operations is associated with the autonomous vehicle being operable by a human operator. For example, the vehicle controller can determine, based on data included in the authorization request the particular mode of operation that is requested. In some examples, the requested mode of operation can be determined based on the source of the authorization request. A request analysis unit 706 is one example of a means for determining, whether the authorization request includes a request to enter into a first mode of operations or a second mode of operations, wherein the first mode of operations is associated with the autonomous vehicle being operated without a human operator and the second mode of operations is associated with the autonomous vehicle being operable by a human operator.

The means can be configured to transition, the autonomous vehicle from the no-authorization state into a standby state in response to determining the authorization request includes a request to enter the first mode of operations or into a manual-controlled state in response to determining the authorization request is a request to enter the second mode of operations. For example, the vehicle controller can transition into a request mode of operations (either the first or the second) based on the authorization request. The vehicle controller can also synchronize with the autonomous vehicle or a secondary lane controller to ensure that the entire autonomous vehicle system has the same state at the same. A transition unit 708 is one example of a means for transitioning the autonomous vehicle from the no-authorization state into a standby state in response to determining the authorization request includes a request to enter the first mode of operations or into a manual-controlled state in response to determining the authorization request is a request to enter the second mode of operations.

Figure 8:
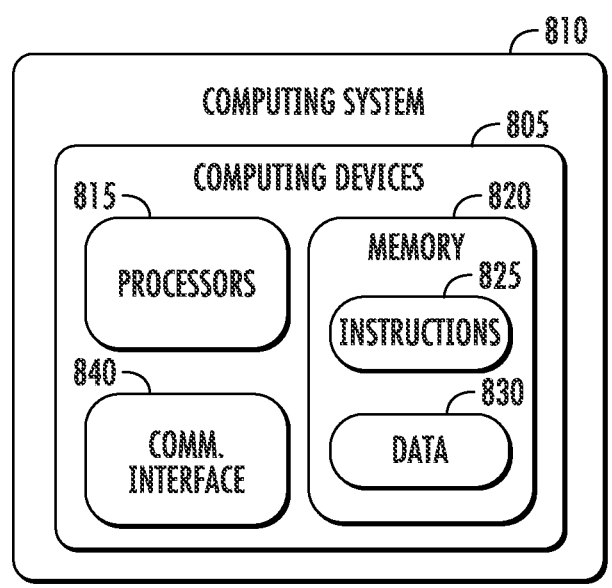
FIG. 8 depicts example system components according to example aspects of the present disclosure.

FIG. 8 depicts example system components according to example aspects of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The computing system 800 can be and/or include the vehicle computing system 112 of FIG. 1. The computing system 800 can be associated with a central operations system and/or an entity associated with the vehicle (e.g., autonomous vehicle 102 in FIG. 1) such as, for example, a vehicle owner, vehicle manager, fleet operator, service provider, etc.

The computing device(s) 805 of the computing system 800 can include processor(s) 815 and at least one memory 820. The one or more processors 815 can be any suitable processing device (e.g., a processor core, a microprocessor, an ASIC, an FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, magnetic disks, data registers, etc., and combinations thereof.

The memory 820 can store information that can be accessed by the one or more processors 815. For instance, the memory 820 (e.g., one or more non-transitory computer-readable storage mediums, memory devices) can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815

For example, the memory 820 on-board the vehicle (e.g., autonomous vehicle 102 in FIG. 1) can store instructions 825 that when executed by the one or more processors 815 cause the one or more processors 815 (e.g., in the vehicle computing system 112) to perform operations such as any of the operations and functions of the computing device(s) 805 and/or vehicle computing system 112, any of the operations and functions for which the vehicle computing system 112 is configured, and/or any other operations and functions described herein.

The memory 820 can store data 830 that can be obtained (e.g., received, accessed, written, manipulated, created, generated, etc.) and/or stored. The data 830 can include, for instance, services data (e.g., trip data, route data, user data, etc.), sensor data, map data, perception data, prediction data, motion planning data, object states and/or state data, and/or other data/information as described herein. In some implementations, the computing device(s) 805 can obtain data from one or more memories that are remote from the autonomous vehicle 102.

The computing device(s) 805 can also include a communication interface 840 used to communicate with one or more other system(s) (e.g., the remote computing system). The communication interface 840 can include any circuits, components, software, etc. for communicating via one or more networks (e.g., network(s)). In some implementations, the communication interface 840 can include, for example, one or more of: a communications controller, a receiver, a transceiver, a transmitter, a port, conductors, software, and/or hardware for communicating data.

Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
   while in a first mode of operations, wherein the first mode of operations is associated with an autonomous vehicle being operated without a human operator:
   receiving a request to exit the first mode of operations;
   determining a readiness of the autonomous vehicle to exit the first mode of operations;
   in response to receiving a signal indicating the readiness of the autonomous vehicle to exit the first mode of operations, transitioning the autonomous vehicle to a standby state;
   while the autonomous vehicle is in the standby state, receiving a confirmation to transition the autonomous vehicle to a no-authorization state; and
   transitioning the autonomous vehicle to the no-authorization state based on the confirmation.

2. The computer-implemented method of claim 1, wherein the no-authorization state is associated with a neutral state wherein the autonomous vehicle does not take any actions for transitioning modes of operations and waits for an authorization request.

3. The computer-implemented method of claim 1, wherein the first mode of operations comprises a plurality of sub-states.

4. The computer-implemented method of claim 3, wherein transitioning the autonomous vehicle to the standby state further comprises:
   transitioning the autonomous vehicle into a first sub-state of the plurality of sub-states of the first mode of operations; and
   while the autonomous vehicle is in the first sub-state, requesting authorization to transition to the standby state.

5. The computer-implemented method of claim 1, wherein the standby state comprises a plurality of substates.

6. The computer-implemented method of claim 3, wherein transitioning the autonomous vehicle to the standby state comprises:
   transitioning the autonomous vehicle to a first sub-state of the plurality of substates of the standby state; and
   receiving a delayed confirmation to transition the autonomous vehicle to the standby state, wherein the delayed confirmation is received within a predetermined time.

7. The computer-implemented method of claim 5, wherein transitioning the autonomous vehicle to the standby sub-state comprises:
   determining that the confirmation to transition the autonomous vehicle to the standby state has not been received within a pre-determined time;
   transitioning the autonomous vehicle to a standby nominal sub-state;
   determining that the confirmation to transition the autonomous vehicle to the no-authorization state has not been received; and
   transitioning the autonomous vehicle to a standby request sub-state.

8. The computer implemented method of claim 1, wherein the readiness of the autonomous vehicle to exit the first mode of operations is based on a motion of the autonomous vehicle.

9. The computer-implemented method of claim 1, wherein the confirmation is associated with a remote computing system providing remote assistance to the autonomous vehicle.

10. The computer-implemented method of claim 1, wherein the no-authorization state comprises a plurality of sub-states, at least one of the sub-states being associated with the transition to the standby state.

11. An autonomous vehicle control system for controlling an operating mode of an autonomous vehicle, the autonomous vehicle control system comprising:
    one or more processors; and
    a non-transitory computer-readable memory storing instructions that, are executable by the one or more processors to perform operations, the operations comprising:
    while in a first mode of operations, wherein the first mode of operations is associated with the autonomous vehicle being operated without a human operator:
    receiving a request to exit the first mode of operations;
    determining a readiness of the autonomous vehicle to exit the first mode of operations;
    in response to receiving a signal indicating the readiness of the autonomous vehicle to exit the first mode of operations transitioning the autonomous vehicle to a standby state;
    while the autonomous vehicle is in the standby state, receiving a confirmation to transition the autonomous vehicle to a no-authorization state; and
    transitioning the autonomous vehicle to the no-authorization state based on the confirmation.

12. The autonomous vehicle control system of claim 11, wherein the no-authorization state is associated with a neutral state wherein the autonomous vehicle does not take any actions for transitioning modes of operations and waits for an authorization request.

13. The autonomous vehicle control system of claim 11, wherein the first mode of operations comprises a plurality of sub-states.

14. The autonomous vehicle control system of claim 11, wherein transitioning the autonomous vehicle to the standby state further comprises:
    transitioning the autonomous vehicle into a first sub-state of the plurality of sub-states of the first mode of operations, the first-substate being indicative of receiving the request to exit the first mode of operations; and
    while the autonomous vehicle is in the first sub-state, requesting authorization to transition to the standby state.

15. The autonomous vehicle control system of claim 11, wherein the standby state comprises a plurality of substates.

16. The autonomous vehicle control system of claim 15, wherein transitioning the autonomous vehicle to the standby sub-state comprises:
    determining that the confirmation to transition the autonomous vehicle to the standby state has not been received within a pre-determined time:
    transitioning the autonomous vehicle to a standby nominal sub-state, wherein the standby nominal sub-state is associated with a no operator standby state;
    determining that the confirmation to transition the autonomous vehicle to the no-authorization state has not been received; and
    transitioning the autonomous vehicle to a standby request sub-state.

17. The autonomous vehicle control system of claim 11, wherein the readiness of the autonomous vehicle is based on a motion of the autonomous vehicle.

18. The autonomous vehicle control system of claim 11, wherein the confirmation is provided via a remote computing system.

19. An autonomous vehicle comprising:
one or more processors; and
a non-transitory computer-readable memory storing instructions that, are executable by the one or more processors to perform operations, the operations comprising:
while in a first mode of operations, wherein the first mode of operations is associated with an autonomous vehicle being operated without a human operator:
receiving a request to exit the first mode of operations;
determining a readiness of the autonomous vehicle to exit the first mode of operations;
in response to receiving a signal indicating the readiness of the autonomous vehicle to exit the first mode of operations, transitioning the autonomous vehicle to a standby state;
while the autonomous vehicle is in the standby state, receiving a confirmation to transition the autonomous vehicle to a no-authorization state; and
transitioning the autonomous vehicle to the no-authorization state based on the confirmation.

20. The autonomous vehicle of claim 19, wherein the no-authorization state is associated with a neutral state wherein the autonomous vehicle does not take any actions for transitioning modes of operations.

\* \* \* \* \*